United States Patent
Ciacci et al.

(10) Patent No.: US 10,812,119 B1
(45) Date of Patent: Oct. 20, 2020

(54) SYSTEMS AND METHODS INVOLVING INTERFERENCE CANCELLATION

(71) Applicant: NXP B.V., Eindhoven (NL)

(72) Inventors: Massimo Ciacci, Den Bosch (NL); Arie Geert Cornelis Koppelaar, Giessen (NL); Alessio Filippi, Eindhoven (NL); Lucien Johannes Breems, Waalre (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/445,924

(22) Filed: Jun. 19, 2019

(51) Int. Cl.
*H04B 1/10* (2006.01)
*H04L 25/03* (2006.01)

(52) U.S. Cl.
CPC ......... *H04B 1/10* (2013.01); *H04L 25/03006* (2013.01)

(58) Field of Classification Search
CPC ...... H04B 1/10; H04B 1/1027; H04B 1/1036; H04B 1/123
See application file for complete search history.

(56) References Cited

U.S. PATENT DOCUMENTS

| | | | |
|---|---|---|---|
| 9,344,125 B2 | 5/2016 | Kpodzo et al. | |
| 9,917,656 B1 | 3/2018 | van der Ploeg et al. | |
| 2002/0006775 A1* | 1/2002 | Kaneda | H04B 7/005 455/65 |
| 2003/0169030 A1* | 9/2003 | Ishii | G01R 29/0892 324/76.78 |
| 2005/0036629 A1* | 2/2005 | Aubauer | H04R 25/453 381/71.1 |

* cited by examiner

*Primary Examiner* — Shuwang Liu
*Assistant Examiner* — Gina M McKie
(74) *Attorney, Agent, or Firm* — Rajeev Madnawat

(57) ABSTRACT

Interference cancellation is provided, according to certain aspects, by a filter, a signal detection circuit, synthesis circuitry and signal-generation circuitry. The filter is used to filter an incoming signal having an associated signal-to-noise metric and to output therefrom a filtered signal having an interference attribute of the incoming signal by amplification and/or isolation. The signal detection circuit is used to detect the interference attribute in the filtered signal. The synthesis circuitry is used to synthesize interference in the incoming signal based on the interference attribute. The signal-generation circuitry is used to generate, in response to the synthesized interference in the incoming signal, a filtered version of the incoming signal which provides an improved signal-to-noise metric.

18 Claims, 10 Drawing Sheets

SYSTEMS AND METHODS INVOLVING INTERFERENCE CANCELLATION

OVERVIEW

Aspects of the present disclosure are directed to systems and methods involving interference cancellation.

The expanding demand for wireless/radio frequency (RF) communications is due to a wide variety of applications being used in a variety of industries and environments. One such representative example is in connection with vehicular communications. Newer vehicles use a substantial amount of electronic circuits. These electronic circuits are susceptible to different types of interference, such as from the vehicle engine, and other types of noise from inside and outside the vehicle.

As an example, one type of interference is impulse noise which may be caused by vehicle engines. Reception of a wanted signal may be impaired by impulse noise, for example, which may originate from electromagnetic interference caused by electronics, electromechanical or electrical devices, or from occasional glitches (e.g., circuit malfunctioning) occurring in the front end of a radio receiver circuit. Impulse noise also occurs frequently in audio recordings due to proximity of a mobile phone signal. In certain specific applications, a further example is impulse noise caused by meta-stability in a quantizer of a sigma delta analog to digital converter (ADC).

In these examples, a noise spectrum may overlap with a wanted signal and may not be removed by ordinary linear filtering, without removing most of the wanted signal.

These and other matters have presented challenges to the accurate and/or efficient wireless/radio frequency (RF) communications in the presence of such noise or interference.

SUMMARY

Various example embodiments are directed to issues such as those addressed above and/or others which may become apparent from the following disclosure concerning a system for interference cancellation.

In certain example embodiments, aspects of the present disclosure involve systems and methods involving interference cancellation.

In a more specific example embodiment, interference cancellation is provided by a filter, a signal detection and estimation circuit, synthesis circuitry and signal-generation circuitry. The filter is used to suppress the wanted part of an incoming signal having an associated signal-to-noise metric and to output therefrom a filtered signal having an interference attribute of the incoming signal by amplification and/or isolation. The signal detection circuit is used to detect and estimate the interference attributes in the filtered signal. The synthesis circuitry is used to synthesize the interference in the incoming signal based on the interference attributes. The signal-generation circuitry is used to generate, in response to the synthesized interference in the incoming signal, a filtered version of the incoming signal which provides an improved signal-to-noise metric.

A number of embodiments are directed to methods of cancelling interference as described above. Filtering an incoming signal having an associated signal-to-noise metric in accordance with various embodiments includes outputting therefrom a filtered signal having an interference attribute of the incoming signal by amplification and/or isolation. The method further includes: detecting the interference attribute in the filtered signal; synthesizing interference in the incoming signal based on the interference attribute; and generating, in response to the synthesized interference in the incoming signal, a filtered version of the incoming signal which provides an improved signal-to-noise metric.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

Figure 1A:
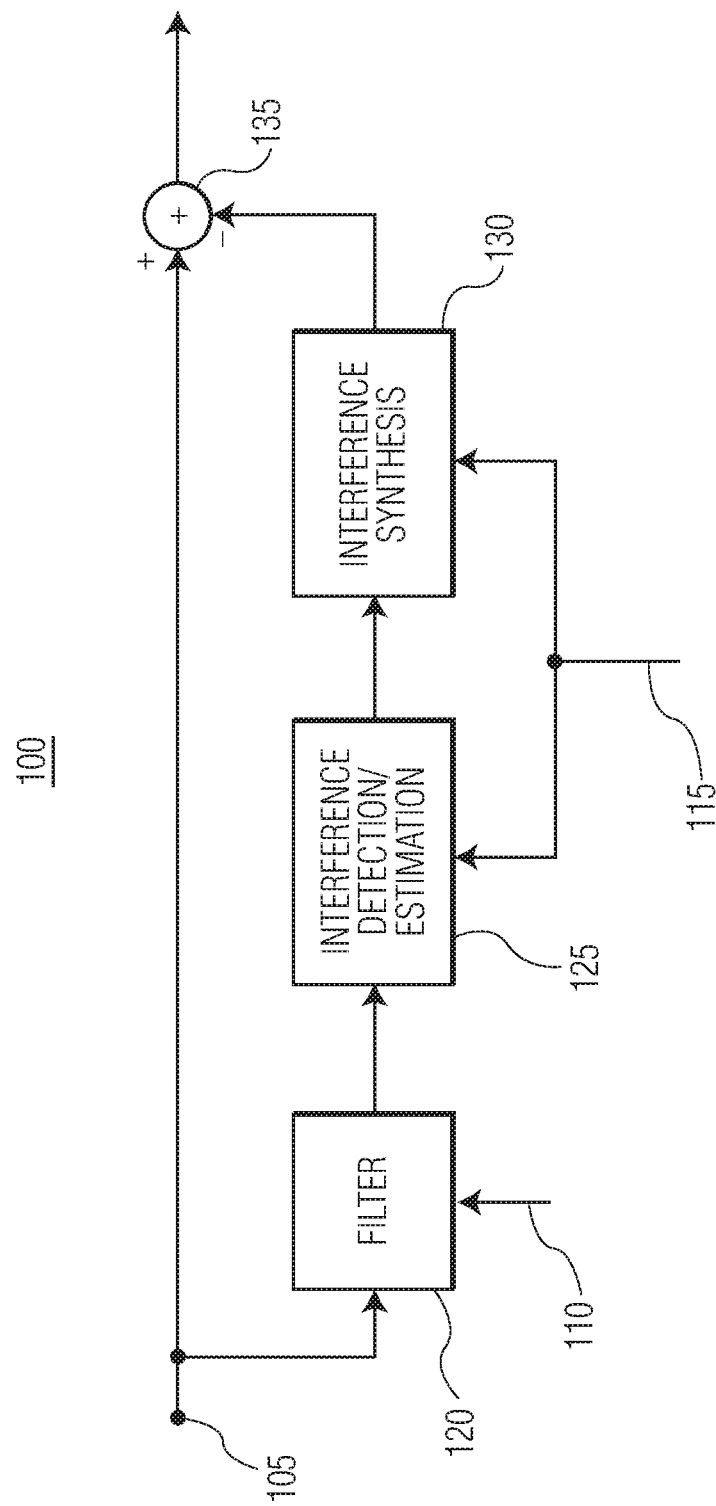
FIG. 1A illustrates an example interference cancellation system, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving cancellation of noise from a received signal. In certain implementations, aspects of the present disclosure have been shown to be beneficial when used in the context of electric/hybrid vehicles (EV/HV) engines, where wideband interference may be generated and may impair reception of AM/FM radio signals. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Embodiments as characterized herein may be implemented in accordance with a variety of different types of systems methods in which impulse noise/interference may be desired to be cancelled or reduced. For instance, one or more of the aspects of the disclosure may be implemented with vehicle engines, such as EV/HV engines, in order to cancel impulse noise that may originate from the vehicles' engines themselves, as well as from other electronic components or circuitry malfunction in the vehicles, and that which may interfere with amplitude modulation (AM) radio signals. The cancellation of interference may be useful, for example, when radio reception (e.g., AM signals) is desired. Impulse noise from the EV may interfere with incoming radio signals, such as AM signals.

One or more of such interference cancellation systems and methods for use in vehicles may include an electronic control unit (ECU) and/or a radio receiver, which is an example of logic/central processing unit (CPU) circuitry as may be useful, for example, for synthesized interference suppression (SIS) in connection with the instant disclosure. At least one ECU may be implemented as an embedded electronic device responsible for overseeing the operation and regulation of various other electrical systems within the automotive environment. During operation of an automobile, for example, other relevant circuits may be integrated (e.g., considered part of and in constant/regular communication) with such circuitry used for SIS. For the purpose of facilitating understanding of aspects of the instant disclosure, the following discussion uses a vehicle-directed example involving such an ECU with associated circuitry capable of SIS.

The ECU in an EV (and/or an HV) having an interference cancellation system, for example, may include circuitry that is capable of synthesized interference suppression (SIS). First, the circuitry of the ECU may include a filter that can be used to filter an incoming signal so as to maximize a signal to interference ratio (SIR). The SIR is the quotient between the average received modulated carrier power and the average received co-channel interference power, and specifically may refer to a ratio (or a relationship) of wanted signal strength to unwanted signal strength. The SIR may alternatively be referred to as a signal-to-noise metric, for example. The ECU may also include circuitry that can detect the interference, and estimate the interference parameters, such as, for example, timing, amplitude, phase and pulse shape. The ECU may also synthesize interference based on the estimated interference parameters, and may then subtract the synthesized interference.

The above and other examples in accordance with the present disclosure are directed to interference cancellation systems. The interference cancellation system may, for example, include a filter, a signal detection circuit, synthesis circuitry, and signal-generation circuitry. The filter may be configured and arranged to filter an incoming signal having an associated signal-to-noise metric, and output therefrom a filtered signal having an interference attribute of the incoming signal by amplification and/or isolation. Some examples of interference parameters include, but are not limited to, timing, amplitude, phase, and pulse shape. The signal detection circuit may be configured and arranged to detect the interference attribute(s) in the filtered signal. The synthesis circuitry may be configured and arranged to synthesize interference in the incoming signal based on the interference attribute or attributes; and the signal-generation circuitry may be configured and arranged to generate, in response to the synthesized interference in the incoming signal, a filtered version of the incoming signal which provides an improved signal-to-noise (SNR) metric.

In a number of embodiments, an interference cancellation system may include circuitry to provide data that identifies the interference attribute. The system may include circuitry to provide data that identifies a priori characteristics of the incoming signal. In such systems involving the above-noted example of a SIS-capable AM (amplitude-modulation) radio receiver, these a priori characteristics include knowledge of data for appreciating which frequencies AM stations are active. Without this a priori knowledge, requiring a search for AM stations may be appropriate.

In other embodiments, the synthesis circuitry may be used to: estimate certain signal-interfering parameters based on the detected interference attribute in the filtered signal; estimate signal-interfering parameters based on a timing attribute discerned using the detected interference attribute in the filtered signal; estimate signal-interfering parameters based on an amplitude attribute discerned using the detected interference attribute in the filtered signal; estimate signal-interfering parameters based on a phase attribute discerned using the detected interference attribute in the filtered signal; estimate signal-interfering parameters based on a pulse shape discerned using the detected interference attribute in the filtered signal; and/or estimate signal-interfering parameters based on at least two of the following as discerned using the detected interference attribute in the filtered signal: a timing attribute; an amplitude attribute; a phase attribute; and a pulse shape.

In various embodiments, the interference attribute manifests itself in the incoming signal as impulse noise. The interference attribute may be caused by operation of a vehicle engine.

In other embodiments, the interference cancellation system may further include a front-end radio frequency receiver circuit to communicate the incoming signal and wherein the interference attribute manifests itself in the incoming signal as impulse noise which is not cancelled in the front-end radio frequency receiver circuit.

In a number of examples, the interference cancellation system may include cancellation of impulse noise such as may be created by the vehicle engine. Other cancellation and interference types may also be addressed as should be apparent given the application.

A number of embodiments are directed to methods of cancelling interference as described above. Filtering an incoming signal having an associated signal-to-noise metric in accordance with various embodiments includes outputting therefrom a filtered signal having an interference attribute of the incoming signal by amplification and/or isolation. The method further includes: detecting the interference attribute in the filtered signal; synthesizing interference in the incoming signal based on the interference attribute; and generating, in response to the synthesized interference in the incoming signal, a filtered version of the incoming signal which provides an improved signal-to-noise metric.

In other embodiments, the method may further comprise: estimating certain signal-interference parameters based on the detected interference attribute in the filtered signal; estimating signal-interfering parameters based on at least two of the following as discerned using the detected interference attribute in the filtered signal: a timing attribute; an amplitude attribute; a phase attribute; and a pulse shape; providing data that identifies the interference attribute; and/or providing data that identifies a priori characteristics of the incoming signal.

Turning now to the figures, FIG. 1A is an example interference cancellation system 100, in accordance with the present disclosure. As shown, the system 100 includes three inputs. A first input may be an incoming signal 105 having or manifesting an associated signal-to-noise ratio (SNR) metric. SNR is a measure used to compare a level of a desired signal to a level of background noise, and is often expressed in decibels (dB). The incoming signal 105 may, for example, include both wanted, or desired, signals and interference signals. A second input into system 100 may be signal (AM) knowledge 110. A third input into system 100 may be interference knowledge 115.

In the example embodiment of FIG. 1, the incoming signal 105 may be passed through a filter 120 configured and arranged to filter the incoming signal 105 having an associated SNR metric. The filter 120 may output a filtered signal having an interference attribute of the incoming signal 105 by amplification and/or isolation. For example, the filter 104 may be any suitable filter that may be configured and arranged so as to maximize an interference-to-signal-and-noise ratio (ISNR) associated with the incoming signal 105. A priori characteristics of the incoming signal 105 may also be identified. In the example, signal amplitude modulation (AM) knowledge 110 (e.g., data indicative of the frequencies corresponding to active AM stations) may be inputted into system 100 at the filter 120.

After filtering, the filtered signal may be outputted to a signal detection circuit 125 that may be configured and arranged to detect and/or estimate an interference attribute or parameter of the filtered signal. Some examples of interference parameters include, but are not limited to, timing, amplitude, phase, and pulse shape. Detecting and estimating one or more interference parameters or attributes may be made more accurate by the preceding filter 120. In the example, interference knowledge 115 may be inputted into system 100 at the signal detection circuit 125.

After detecting and/or estimating at least one interference parameter or attribute, interference may be synthesized in order to effectively cancel the interference. Interference synthesis circuitry 130 may be configured and arranged to synthesize interference in the incoming signal based on the interference attribute detected at the signal detection circuit 125. In the example, interference knowledge 115 may also be inputted into system 100 at the synthesis circuitry 130.

In the specific example embodiment, a signal subtraction technique is employed to remove impulse noise from, for example, the AM signal. The synthesized interference may be subtracted, and resulting output 135 may reflect such an interference subtraction.

In another related example embodiment, the system 100 may synthesize interference affecting a received or incoming signal and subtract it at output 135, as depicted in FIG. 1A. In a specific example, the associated method may include steps, such as: (1) filtering an incoming signal so as to maximize an interference to signal ratio (a priori knowledge on a wanted signal and/or interference may be used here); (2) detecting the interference, and estimating one or more interference parameters, e.g., timing, amplitude, phase and pulse shape (this step may be made more accurate by the preceding filtering step); (3) synthesizing the interference based on the estimated interference parameter or parameters; and (4) subtracting the synthesized interference. Additional or alternative method steps are also contemplated.

Figure 1B:
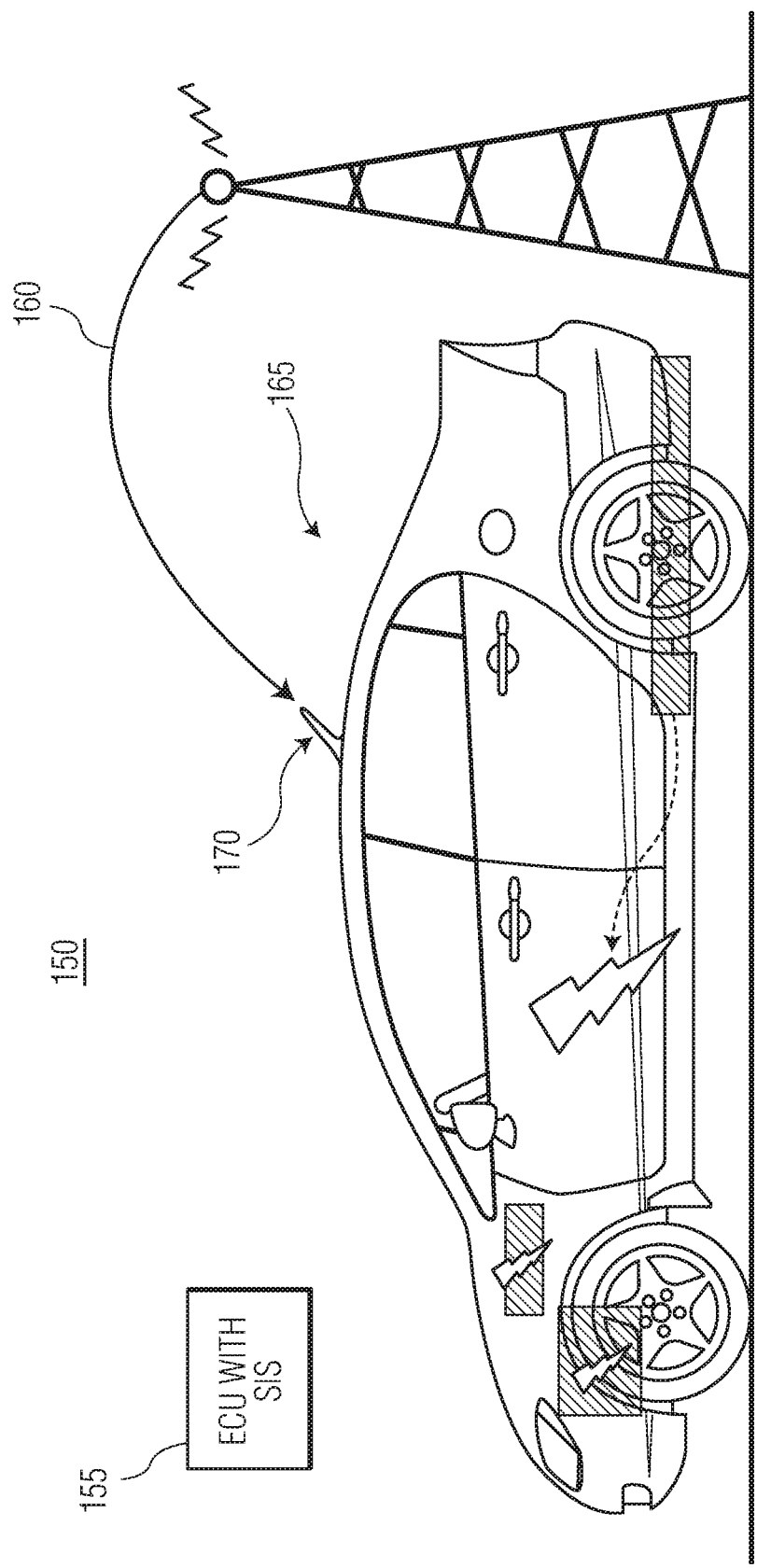
FIG. 1B illustrates an example implementation of an interference cancellation system, in accordance with the present disclosure.

As illustrated by FIG. 1B, one implementation of the present disclosure involves a system 150 involving an electronic control unit (ECU) 155, which is an example of circuitry with synthesized interference suppression (SIS) as exemplified in the above discussion of FIG. 1A. In the specific embodiment shown, EV noise interference onto a received AM signal 160 is depicted. An electric vehicle 165 receiving a radio signal 160, may have the radio signal 160 affected by electromagnetic (EM) interference that may be generated by the engine, a global system for mobile communication (GSM), other electronics, or circuit malfunctioning, for example. Such interference may reach the radio antenna 170 of the EV 165 in a variety of ways. The ECU with SIS 155 may be an example of the interference cancellation system as shown in FIG. 1A and described above, for example.

Figure 2:
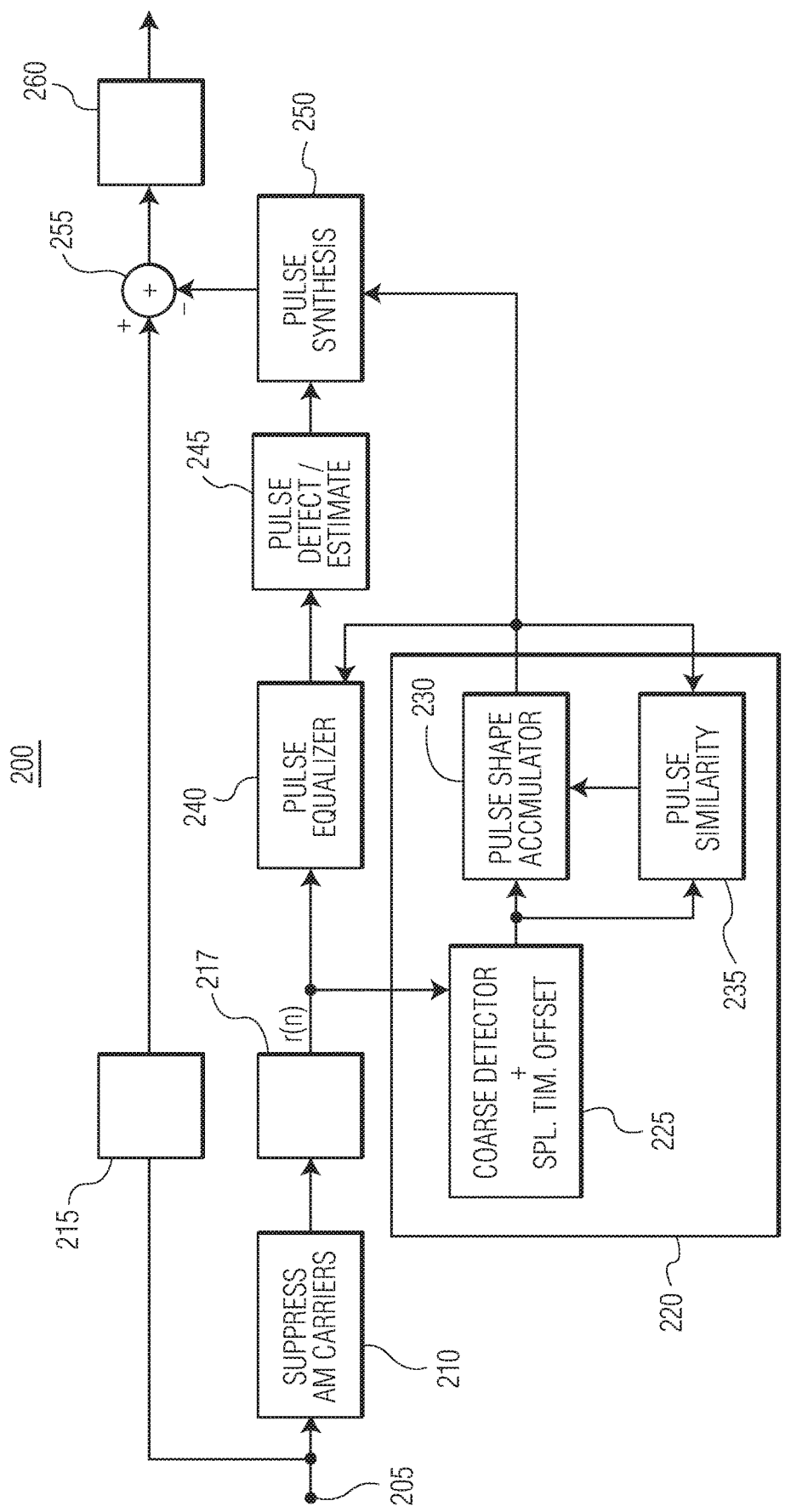
FIG. 2 illustrates an example interference cancellation system, in accordance with the present disclosure.

FIG. 2 illustrates an example of a system and/or method of impulse noise cancellation 200, in accordance with the present disclosure. The impulse noise cancellation system 200 may be used in the case of EV impulse noise onto an amplitude modulation (AM) signal. In the system 200, a signal input 205 may include a received or incoming signal that may include both wanted signals and interference signals, for example. In a specific example, the input 205 may include IQ ADC data for an AM signal, and pulses.

As shown in FIG. 2, a first circuit 210 may be configured and arranged to suppress a signal, such as an AM signal, for example. The first circuit 210 may also be configured and arranged to maximize an interference-to-signal ratio. Suppression of the signal may improve identification of an interferer, or interference parameter, by another circuitry component of the system 200.

In a specific example, the first circuit 210 (e.g., a carrier frequency-selective filter) may be used to suppress main AM carriers, obtained by notching the AM frequencies with a bandwidth (BW) of, for example, +85 Hz around each carrier. Other ranges of bandwidth around each carrier are contemplated, however, and are not limited to those described herein. In the example, AM suppression may reduce the wanted signal, for example, thereby making the unwanted signal easier to detect and also easier to estimate associated interference.

A second circuit 215 may be configured and arranged to oversample the received (or input) signal 205 in order to, for example, minimize pulse position error in accumulation of pulses for estimating pulse shape. Maximum pulse position error may, for example, be reduced from one-half to one-eighth of a sample time after such an oversampling step is carried out. The range of reduction of maximum pulse position error from one-half to one-eighth is an example range, and other fractions or ratios are contemplated.

In the example shown in FIG. 2, a model of a received signal r(n) after over-sampling by the second circuit 215, or oversampler, may be written as $$r(n) = w(n) + i(n) = w(n) + \sum_m p_m(n - t_m) = w(n) + \sum_m A_m e^{j\phi_m} p(n - t_m) \quad (1)$$

where w(n) represents an unknown wanted signal, and i(n) represents an unknown interference signal. The interference may be modelled as a train of complex pulses $p_m(n-t_m)$, with a random delay $t_m$, and each with its own complex weight. Each interfering pulse $p_m$ may be described by a common normalized complex impulse response p(n) (p(0)=1), by a complex central tap weight, $A_m e^{j\phi_m}$ (where $A_m$ is the amplitude and $\phi_m$ the phase in the IQ plane), and by the pulse timing $t_m$, which may all different for every pulse.

At the output of the AM suppression block (first circuit 210 in FIG. 2), a third circuit 217 may be located, which may be similar to the oversampler of second circuit 215. The received, suppressed signal, after over-sampling, may be represented by $r_i(n)$, which may have a similar description as r(n) in equation (1) above, except that the wanted signal w(n) has been reduced as much as possible to facilitate estimation of the complex pulse p(n), common to the whole interference signal, and the pulse parameters $A_m$, $\phi_m$, $t_m$, for each received pulse. As with second circuit 215, maximum pulse position error may, for example, be reduced from one-half to one-eighth of a sample time after such an oversampling step is carried out by third circuit 217. The range of reduction of maximum pulse position error from one-half to one sixteenth is an example range, however, and other fractions or ratios are contemplated, such as those ranging from two-thirds (⅔) to one-quarter (¼). In one such specific example, after an oversample at a ratio of 1:8, at most ±1/16 sample error occurs (i.e., ½ sample of the faster ones), whereas originally a peak could occur anywhere in [−½ ... ½] samples away from the true peak time in a time continuous spectrum. In this regard, it is appreciated that a higher rate of oversampling for estimation (and subtraction before returning to use of the original rate) is advantageous to reduce error in the position of the pulse, and to provide a more accurate estimation of the pulse shape and a more accurate cancellation.

A fourth circuit 220 may be configured and arranged to estimate pulses, and may be known as a pulse estimator. The fourth circuit 220 may not be necessary when the pulse shape p(n) is known a priori, e.g. when the analog-digital front-end chain may be the limiting factor in the pulse bandwidth. However, using a pulse estimator, such as fourth circuit 220, may be advantageous.

The fourth circuit 220 (pulse estimator) may be driven by a coarse pulse detector 225, which may be configured and arranged to result in pulse accumulation in the pulse estimator 220. The coarse pulse detector 225 may include sample timing offset. One embodiment of the coarse pulse detector 225 is shown in and described with regard to FIG. 3 below. The fourth circuit 220 may also include a pulse shape accumulator 230 and a pulse similarity 235. The output of the pulse estimator 220 may be an average pulse register.

Figure 3:
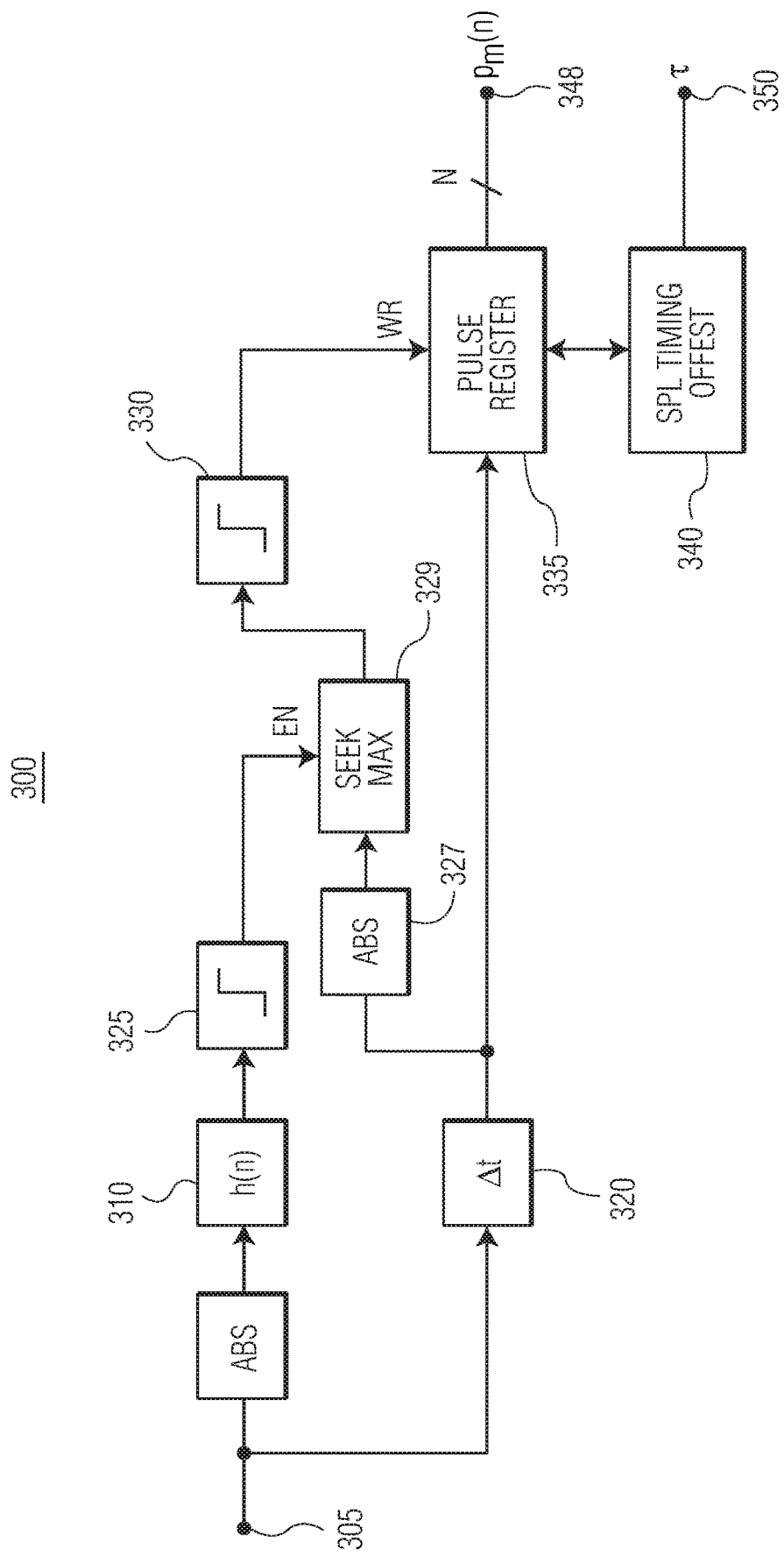
FIG. 3 illustrates a block diagram of a coarse pulse detector, in accordance with the present disclosure.

One example of circuitry configured and arranged for coarse pulse detection 300 is shown in FIG. 3 in a block diagram. For the embodiment shown, a pulse with a main peak at its center (such as a sinc pulse, a root raised cosine pulse, or a Gaussian pulse) may be assumed (The notation "sinc" refers to "sin(x)/x"). Other pulse shapes are contemplated, however, and may need modification of the embodiment shown.

In the example embodiment, an input 305 of an IQ signal that is AM suppressed, may be received by the coarse pulse detector 300 and inputted to a half band differentiator circuit 310. The absolute value of the signal input 305 may be taken and the resulting signal may be output to a filter of differentiator 310. The differentiator 310 may have, for example, an impulse response $h_k$=[1,0,−1], where k=original sample time index, interpolated to $h_n$ in the oversampled domain n. The filter $h_n$ may, for example, be applied to signal amplitude.

An output signal from the filter of the differentiator 310, representing pulse slope, may be compared against a given threshold (THRd), at block 325. When the threshold is exceeded, the peak of the pulse in an unfiltered and delay-aligned amplitude signal may be sought. A fixed delay Δt 320 may be referred to as a peak of the differentiator 310, not to its mid tap. The delta t block 320, in FIG. 3, leads to an "abs" block (e.g., 327), and Seek Max block 329 to detect the maximum level), or leads directly to the pulse register. When the peak is above a given minimum threshold (which may be 17000, for example, shown at block 330, the pulse may be selected as a candidate pulse for accumulation and may enter a pulse register 335. Peak threshold (THRa) may be about ⅓ of the maximum interference level to prevent triggering on pulse side lobes. Output 345 from the pulse register 335 may be outputted.

Alternatively, based on the pulse register 335, a pulse timing offset may be derived (block 340). Such an offset may be estimated using an early late detector, $\tau = \alpha(p(1)-p(-1))/p(0)$, where 0 is the pulse peak time and 1,−1 are one full sample period $T_s$ (in the non-oversampled domain) away from it. The pulse estimator (220 in FIG. 2) may use the pulse timing offset estimate τ to discard from accumulation the pulses which have an offset larger than some desired maximum, smaller than ½/OSR, where OSR is the oversample rate, (e.g., |τ|<0.1). Such an example of preselection may improve accuracy of accumulation by discarding pulses that may be too distorted by the wanted signal.

Referring back to FIG. 2, an extra safety measure in the pulse estimator 220 may be implemented by the pulse similarity block 235. The purpose of the pulse similarity block 235 may be to only accumulate isolated pulses, i.e., which may not have a neighbor within the chosen pulse support length. The pulse similarity block 235 may be input driven, and may check that accumulator input (from block 230) has some expected symmetry properties (such as $|p_m(t)-p_m(-t)^*|<\varepsilon$), or based on the already accumulated values. Pulse shape accumulation (block 230) may be performed according to maximum ratio combining (matched filtering), i.e. in our case for best interference to wanted ratio of the resulting sum:

$$\hat{p}(n) = \sum_m p_m(0) * p_m(n) \quad (2)$$

where $p_m(0)$ is the central tap value of the current pulse (the complex value corresponding to the maximum amplitude sample), already available in the pulse register.

In FIG. 2, a fifth circuit 240 may be configured and arranged to equalize pulses received from the second circuit 217 on base of the output of the pulse estimator 220. The output from both the pulse estimator 220 and from the second circuit 217 may be sent on to the fifth circuit 240. The equalizer coefficients may be calculated based on the output of the circuitry depicted as 220 (and more specifically 230). The equalizer output uses the coefficients and the signal input which comes from block 215.

In the example embodiment, after pulse equalization, the signal may be outputted to a sixth circuit 245 that may be configured and arranged to detect or estimate an interference attribute in a received (or filtered) signal. Some examples of interference parameters or attributes include, for example, timing, amplitude, phase and pulse shape.

In the example shown in FIG. 2, peak interference parameters or attributes are outputted to a seventh circuit 250, which may be referred to as a pulse synthesizer. The pulse synthesizer 250 may be configured and arranged to synthesize interference in the received (or filtered) signal based on an identified interference attribute. The synthesized interference may then be subtracted from the signal at output 255, thereby cancelling the interference. Signal output 255 may result and may be a filtered version of the received signal which may provide an improved signal-to-noise metric. The output 255 may be outputted to an AM demodulator, for example.

An eighth circuit is shown at block 260, which includes a downsampling circuit that downsamples the filtered version of the received signal to the original sample rate, i.e., the same sample rate as the input signal 205.

Each of the next several figures (FIGS. 4A, 4B, 5A, 5B, 6A and 6B) pertain to operation of specific experimental circuitry consistent with the examples shown in FIGS. 2 and 3.

Figure 4A:
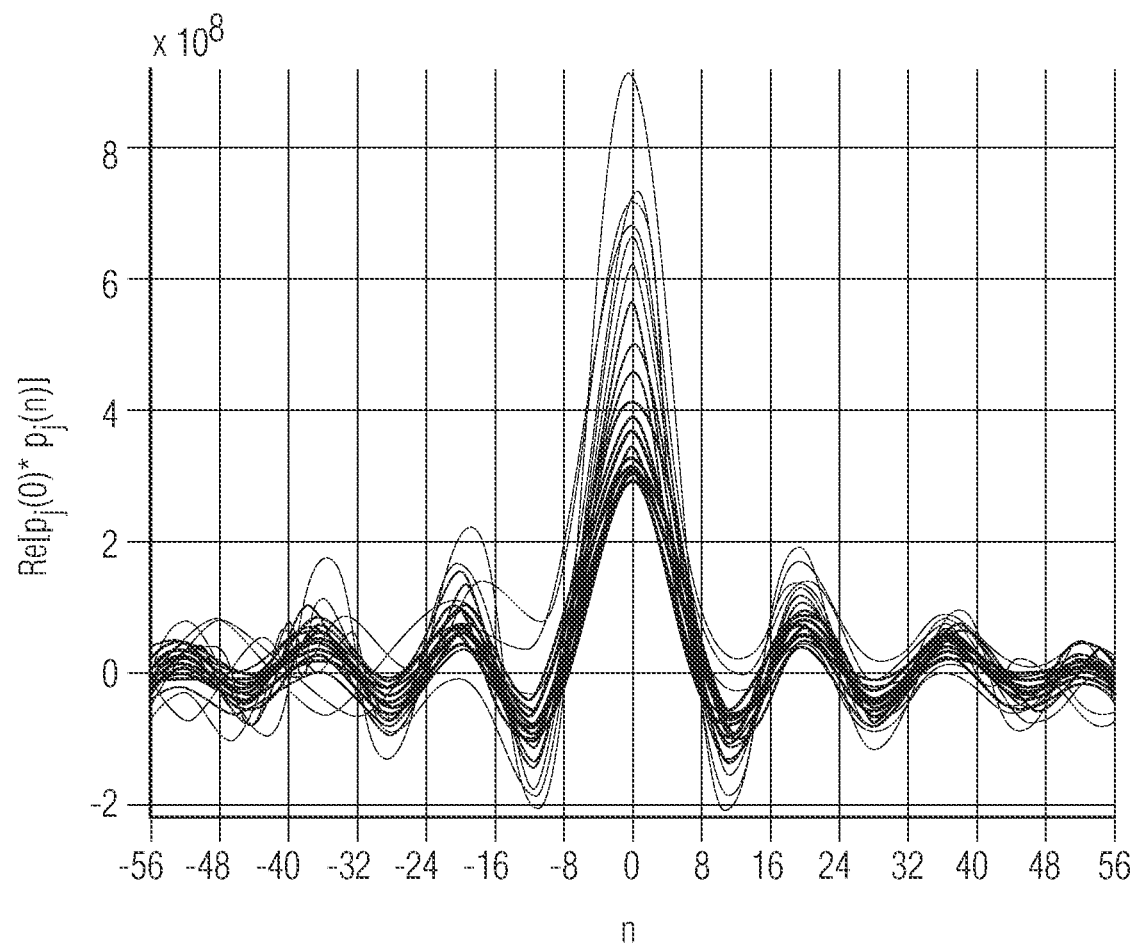
FIG. 4A illustrates a graph of accumulator input (e.g., with signal sufficiently regular per a similarity test) to be used in obtaining a related average, in accordance with another specific and related example of the present disclosure.
Figure 4B:
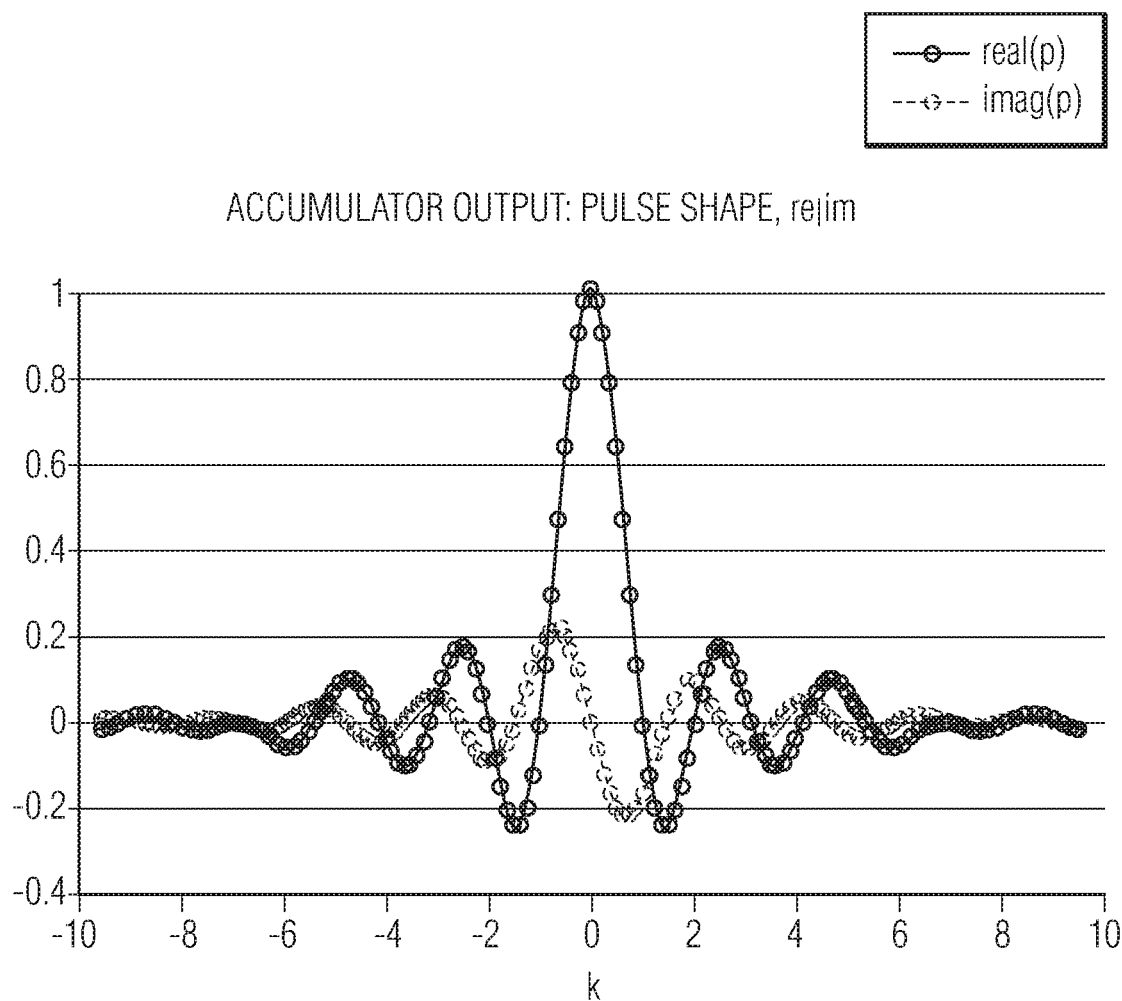
FIG. 4B illustrates a graph of accumulator output, in accordance with yet another specific and related example of the present disclosure.

FIGS. 4A and 4B, respectively, show graphs of examples of pulse accumulator input and output. The pulse shown in the figures has large side-lobes with negative real value. This may cause origin crossing in the IQ plane, and disruption of the AM signal. Moreover, when side-lobes are large, it may cause false detections when attempting to correct pulses that may have a peak that is lower than the side-lobes of the largest pulses.

Referring back to the pulse equalizer 220 shown in FIG. 2, the pulse equalizer may include a complex finite impulse response (FIR) filter that may be configured and arranged to suppress pulse side-lobes and enable detection of smaller pulses. Such a step may be desired due to a large dynamic range variation of interference, which may range from 2400 to 48000 in the example shown (26 dB). Other ranges are contemplated, however, for other examples.

The purpose of the pulse equalizer 220 may be to reduce side-lobes to a level below −26 dB (0.05), for example. The side-lobe amplitude in the example of FIG. 4A is −12 dB. At the same time, the pulse equalizer may not make the main-lobe wider because such widening may deteriorate pulse timing estimation accuracy. The pulse equalizer, therefore, may be a trade-off between side-lobe suppression and main-lobe width.

In accordance with the present disclosure, the impulse response of the pulse equalizer 220 may be determined in several ways, e.g., with computer processing having linear solvers that optimize side-lobe suppression and minimize main-lobe width. An example embodiment may start from estimated pulse impulse response, and may calculate a minimum mean square error (MMSE) solution to a Gaussian Target Response with a given sigma (using, e.g., normalization equations, or at least means square (LMS) algorithm). The sigma of the target response may need to be larger than that of the original pulse, ~1.6x, but may not be too large as to lose timing resolution for consecutive pulses.

A normalization equation may read as follows.

$$h = \text{MinArg}(|X \cdot h - y|^2, \text{ for all } h) \leftrightarrow X^T \cdot X \cdot h - X^T \cdot y = 0 \qquad (3)$$

where h is equalizer response, X is convolution matrix, whose columns contain the estimated pulse, and y is a vector containing the Gaussian target response.

The effect of the equalization may also be that of generally removing an imaginary part from p(t), so that each $p_m(t)$, after equalization, may have a constant phase in the IQ plane, equal to that of its central tap. See, e.g., FIG. 6B infra with the equalized (needle-like) pulse shown on the real axis. As a result, the phase estimates $\phi_m$ may become insensitive to residual timing offsets.

Figure 5A:
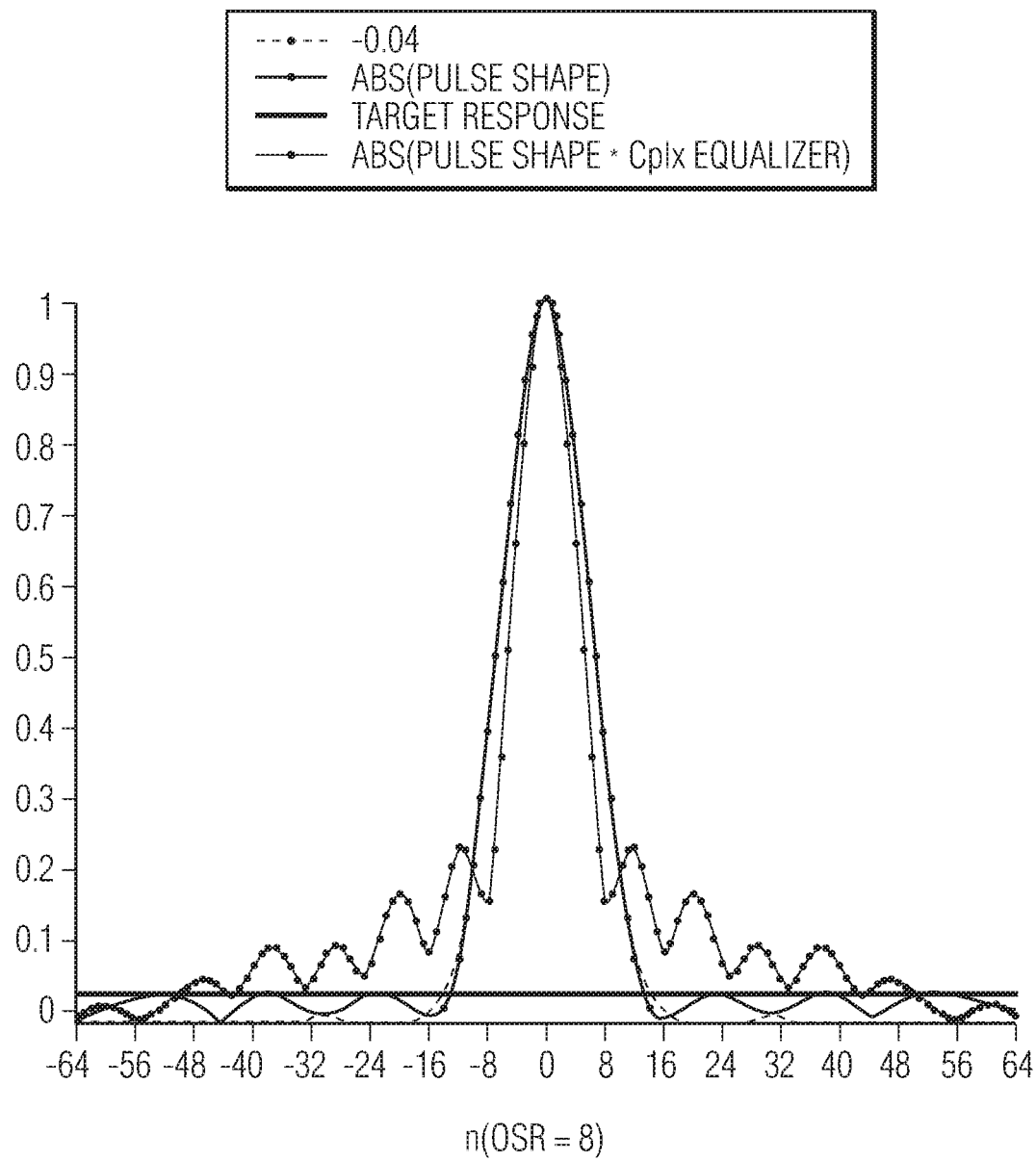
FIG. 5A illustrates an example target response equalization for side-lobe attenuation, in accordance with the present disclosure.
Figure 5B:
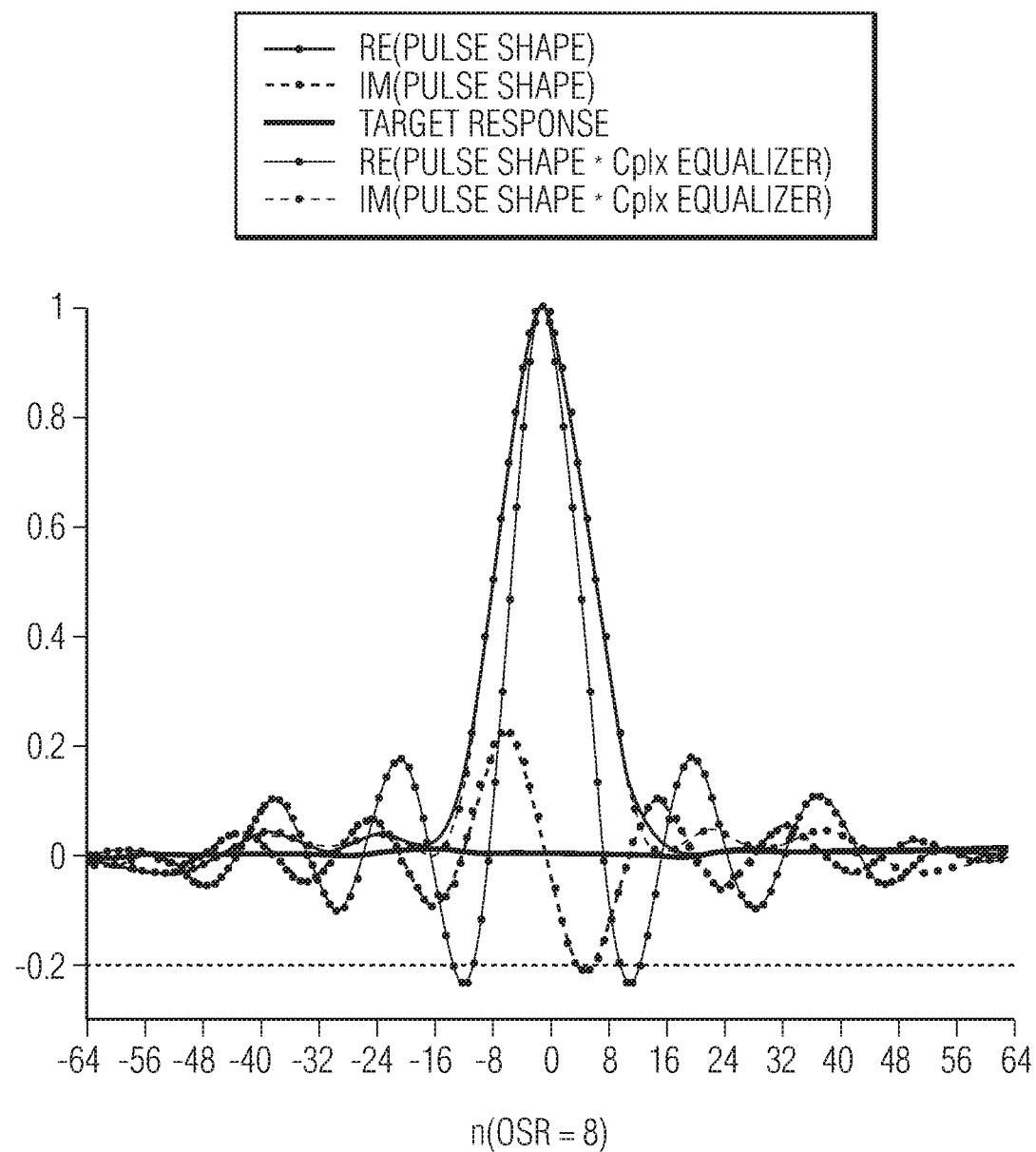
FIG. 5B illustrates a graph of results after side-lobe attenuation of the example of FIG. 5A, in accordance with the present disclosure.

FIG. 5A includes a graph that illustrates an example target response, together with the absolute value of the results of the complex equalization with, for example, 17 taps @ OSR-8. The equalization coefficients may be obtained via equation (3) above. The pulse equalizer (216 in FIG. 2) may attenuate the sidelobes by 28 dB (0.04), for example, with example results shown in FIG. 5B (unlike the absolute value plot of FIG. 5A, FIG. 5B illustrates the real and imaginary parts). Larger attenuation of the side-lobes may require a larger sigma in the target response, and may result in a loss of timing resolution for contiguous pulses.

Figure 6A:
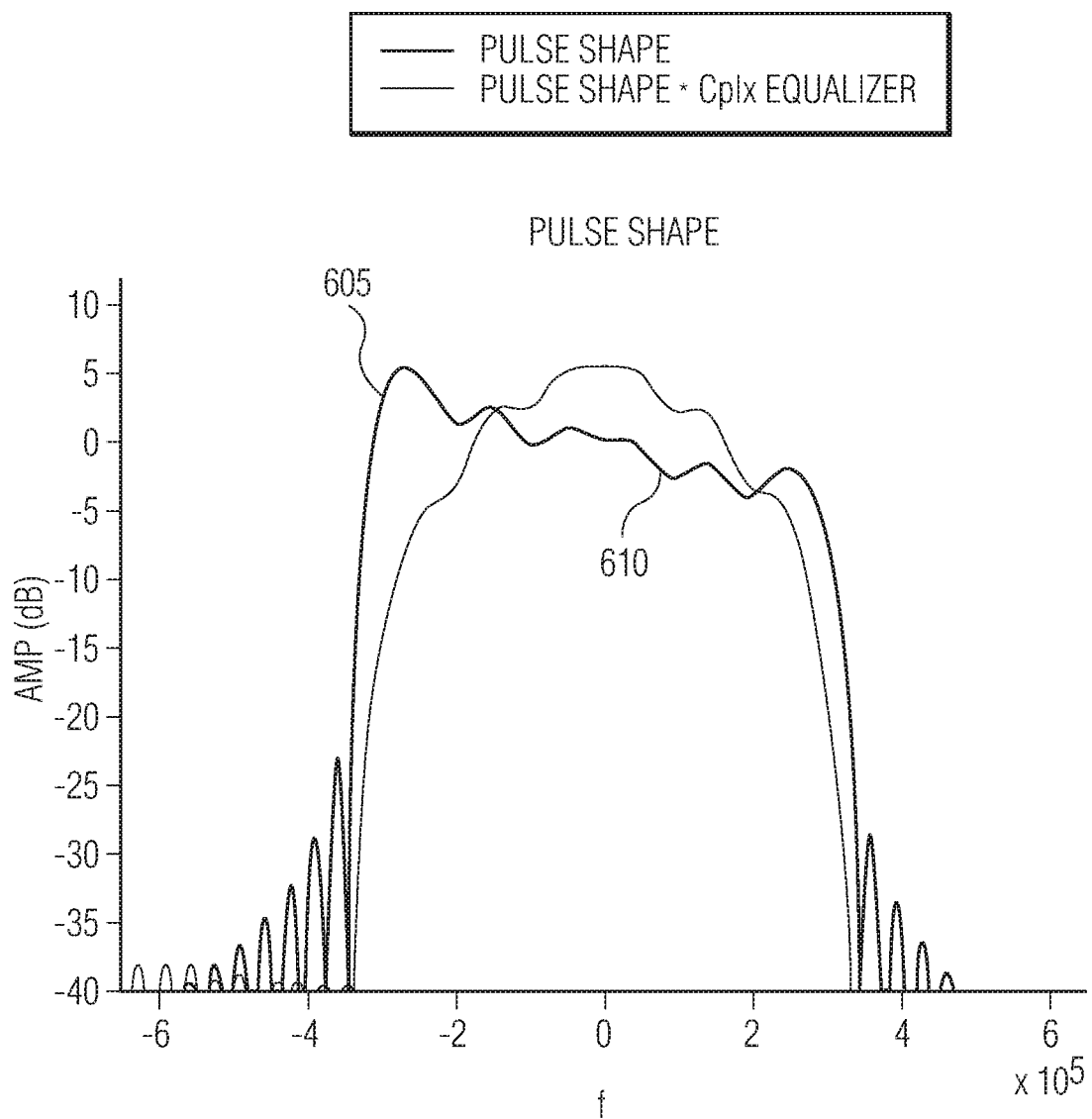
FIG. 6A illustrates a graph of an equalized pulse shape and a non-equalized pulse shape in a frequency domain, in accordance with the present disclosure.
Figure 6B:
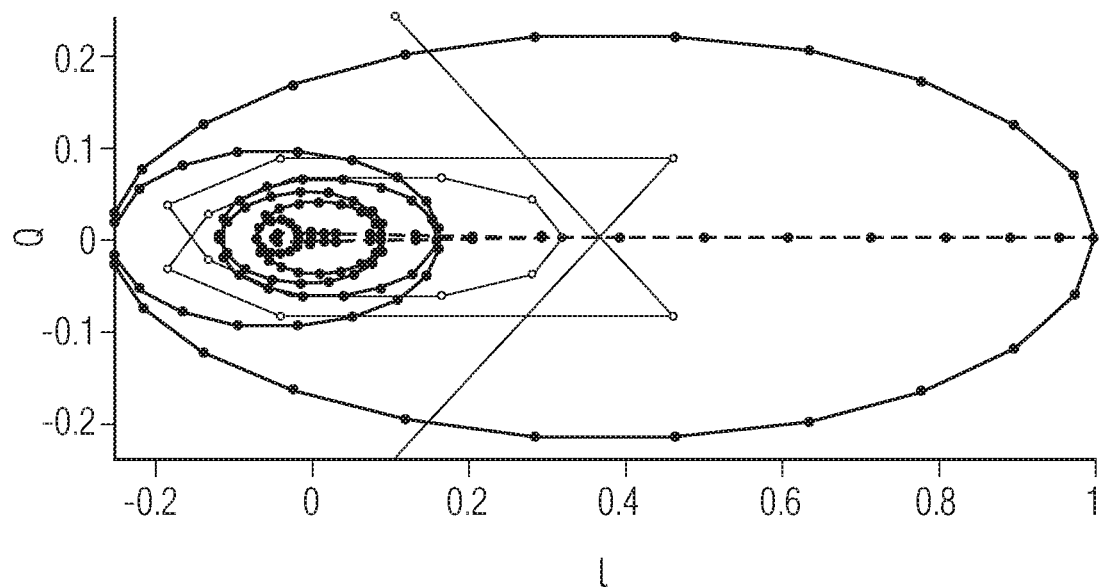
FIG. 6B illustrates time trajectories of pulses in the complex plane, in accordance with the present disclosure.

In connection with a specific detailed example, FIG. 6A illustrates an equalized and a non-equalized pulse shape in the frequency domain with amplitude shown along the y-axis in terms of decibels (dB) and relative frequency shown on the x-axis on either side of the center frequency (and on a scale depicted as $\times 10^5$). The upper plot 605 and lower plot 610 are, respectively, with and without equalization. Asymmetry reflects a clockwise rotation of the impulse response in the IQ plane. FIG. 6B illustrates a related set of time trajectories of pulses in the complex domain (which may correspond to the plots in FIG. 5B, with Imag(p(t)) as a function of Real(p(t))) to show that an equalized pulse becomes largely real (thereby with a symmetric frequency response), and its first sidelobe may be reduced or suppressed by 16 dB from −0.25 to +0.04, and all other sidelobes may be below 0.04. In this detailed example, this lower level happened to be a useful minimum found for a specific application involving a large dynamic range variation in the pulses (e.g., the largest pulse being 48000 and the smallest being about 2000; with the AM signal originally being at about 2000 but after AM suppression dropping below 500.)

After the step of pulse equalization, peak detection and estimation (245 in FIG. 2) may proceed with a simple local maximum of the signal amplitude when above a predefined threshold THRa', much lower than the one used in the pulse estimator. Once pulse estimation has been established, next steps (of synthesis and subtraction) may be performed. The pulse shape may be known, and a priori pulse synthesis may begin. The final step then, in the interference cancellation system or method, is to subtract the synthesized interference on the base of the estimated pulse shape and the pulse parameters $A_m, \phi_m, t_m \ldots$.

The examples of impulse noise/interference cancellation systems and methods described herein may be used in various systems to prevent or minimize interference or impulse noise from common (powerful) engines. For example, such systems and methods may be used in non-automobile vehicles (e.g., airplanes), industrial plants and factories. The systems and methods may be used to filter an incoming signal having an associated signal-to-noise metric, and output therefrom a filtered signal having an interference attribute that is detected. The system may then synthesize interference based on the detected interference attribute. The synthesized interference may then be subtracted from the signal, thereby cancelling the interference.

According to the instant disclosure, certain uses (and in some instances application-specific embodiments) of interference cancellation systems and methods have applications in technologies in which a wanted signal and an interfering signal overlap in frequency domain and time domain, for example. Usually multiple antennas may be used to separate the wanted and interfering signals, exploiting spatial separation of the two signals. In these systems, a second antenna may be used to receive the interfering signal such that after signal processing may be subtracted from the main antenna signal that contains wanted and interfering signals. The present disclosure may be applied in systems where for one or more reasons (such as, for example, cost, space, etc.) a second antenna cannot be used. In such a case, and the interfering signal may be estimated from the main antenna signal. The present disclosure may also be used in systems where a second antenna may be used, but where such an antenna may not provide sufficient isolation from the wanted signal to reliably estimate the interference.

One specific example of an application-specific embodiment of the present disclosure that is disclosed is Amplitude Modulated (AM) radio communication/reception in an EV where the electrical engine may cause interference to AM reception. Use of a second antenna to probe the interference may be possible but costly and cumbersome. Especially for mass-market EVs, a low-cost solution is possible using the systems and methods of the present disclosure, which eliminates a second antenna. An example embodiment of the present disclosure may involve an electric car with an AM receiver not employing a second antenna, but with a single signal source.

Using a method or system of interference cancellation that does include an additional receiver front end, or antenna, for example, may be advantageous. Examples in accordance with the present disclosure involve a method to cancel the interference, based on a single signal source, i.e. without the need of an additional receiver front end. Instead of probing the interference, the interference signal may be emulated from a single signal source, and then subtracted. The impulse interference properties may be detected and estimated adaptively from the only signal source available.

The skilled artisan would recognize that various terminology as used in the specification (including claims) connote a plain meaning in the art unless otherwise indicated. As examples, the specification describes and/or illustrates aspects useful for implementing the claimed disclosure by way of various circuits or circuitry which may be illustrated as or using terms such as blocks, modules, device, system, unit, controller, transmitter, receiver, filter circuit, and/or other circuit-type depictions (e.g., reference numerals 110, 125, 130 of FIG. 1, reference numerals 210, 220, 240, 245, 250 of FIG. 2, and componentry in FIG. 3 may depict a block/module as described herein). Such circuits or circuitry are used together with other elements to exemplify how certain embodiments may be carried out in the form or structures, steps, functions, operations, activities, etc. For example, in certain of the above-discussed embodiments, one or more receivers/receiver circuitry or other components are or include discrete logic circuits or programmable logic circuits configured and arranged for implementing these operations/activities, as may be carried out in the approaches shown in FIGS. 1, 2, and 3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein used by the programmable circuit to perform the related steps, functions, operations, activities, etc. Depending on the application, instructions (and/or configuration data) can be configured for implementation in logic circuitry, with the instructions (whether characterized in the form of object code, firmware or software) stored in and accessible from a memory (circuit). As another example, where the specification may make reference to a "first [type of structure]", a "second [type of structure]", etc., where the [type of structure] might be replaced with terms such as "receiver," "transmitter," "circuit", "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to receive . . . " is interpreted as "circuit configured to receive . . . ").

Based upon the above discussion and illustrations, those skilled in the art will readily recognize that various modifications and changes may be made to the various embodiments without strictly following the exemplary embodiments and applications illustrated and described herein. For example, systems and methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An interference cancellation system comprising:
a filter to filter an incoming signal having an associated signal-to-noise metric and to output therefrom a filtered signal having an interference attribute of the incoming signal by amplification and/or isolation;
a signal detection circuit to detect the interference attribute in the filtered signal;
synthesis circuitry to synthesize interference in the incoming signal based on the interference attribute; and
signal-generation circuitry to generate, in response to the synthesized interference in the incoming signal, a filtered version of the incoming signal which provides an improved signal-to-noise metric.

2. The interference cancellation system of claim 1, wherein the system includes circuitry to provide data that identifies the interference attribute.

3. The interference cancellation system of claim 1, wherein the system includes circuitry to provide data that identifies a priori characteristics of the incoming signal.

4. The interference cancellation system of claim 1, wherein the synthesis circuitry is to estimate certain signal-interfering parameters based on the detected interference attribute in the filtered signal.

5. The interference cancellation system of claim 1, wherein the synthesis circuitry is to estimate signal-interfering parameters based on a timing attribute discerned using the detected interference attribute in the filtered signal.

6. The interference cancellation system of claim 1, wherein the synthesis circuitry is to estimate signal-interfering parameters based on an amplitude attribute discerned using the detected interference attribute in the filtered signal.

7. The interference cancellation system of claim 1, wherein the synthesis circuitry is to estimate signal-interfering parameters based on a phase attribute discerned using the detected interference attribute in the filtered signal.

8. The interference cancellation system of claim 1, wherein the synthesis circuitry is to estimate signal-interfering parameters based on a pulse shape and on at least two of the following as discerned using the detected interference attribute in the filtered signal: a timing attribute; an amplitude attribute; and a phase attribute.

9. The interference cancellation system of claim 1, wherein the interference attribute manifests itself in the incoming signal as impulse noise.

10. The interference cancellation system of claim 1, wherein the interference attribute is caused by operation of a vehicle engine.

11. The interference cancellation system of claim 1, further including a front-end radio frequency receiver circuit to communicate the incoming signal and wherein the interference attribute manifests itself in the incoming signal as impulse noise which is not cancelled in the front-end radio frequency receiver circuit.

12. The interference cancellation system of claim 1, wherein the synthesis circuitry is to synthesize interference in the incoming signal also based on a priori aspects of a pulse shape associated with the incoming signal, and to estimate signal-interfering parameters based on a pulse shape discerned using the detected interference attribute in the filtered signal.

13. An interference cancellation system comprising:
a filter to filter an incoming signal having an associated signal-to-noise metric and to output therefrom a filtered signal having an interference attribute of the incoming signal by amplification and/or isolation;
a signal detection circuit to detect the interference attribute in the filtered signal;
synthesis circuitry to synthesize interference in the incoming signal based on the interference attribute and to estimate signal-interfering parameters based on a pulse shape discerned using the detected interference attribute in the filtered signal; and
signal-generation circuitry to generate, in response to the synthesized interference in the incoming signal, a filtered version of the incoming signal which provides an improved signal-to-noise metric.

14. An interference cancellation method comprising:
filtering an incoming signal having an associated signal-to-noise metric and to output therefrom a filtered signal having an interference attribute of the incoming signal by amplification and/or isolation;
detecting the interference attribute in the filtered signal;
synthesizing interference in the incoming signal based on the interference attribute and based on a priori aspects of a pulse shape associated with the incoming signal; and
generating, in response to the synthesized interference in the incoming signal, a filtered version of the incoming signal which provides an improved signal-to-noise metric.

15. The method of claim 14, further comprising
estimating certain signal-interference parameters based on the detected interference attribute in the filtered signal.

16. The method of claim 14, further comprising
estimating signal-interfering parameters based on at least two of the following as discerned using the detected interference attribute in the filtered signal: a timing attribute; an amplitude attribute; a phase attribute; and a pulse shape.

17. The method of claim 14, further comprising
providing data that identifies the interference attribute.

18. The method of claim 14, further comprising
providing data that identifies a priori characteristics of the incoming signal.

\* \* \* \* \*